(12) United States Patent
Du et al.

(10) Patent No.: US 11,470,261 B2
(45) Date of Patent: Oct. 11, 2022

(54) THREE-DIMENSIONAL DISTANCE MEASURING METHOD AND DEVICE

(71) Applicant: RAYZ TECHNOLOGIES CO. LTD., Beijing (CN)

(72) Inventors: Detao Du, Beijing (CN); Ruxin Chen, Beijing (CN)

(73) Assignee: RAYZ TECHNOLOGIES CO. LTD., Beijing (CN)

( * ) Notice: Subject to any disclaimer, the term of this patent is extended or adjusted under 35 U.S.C. 154(b) by 0 days.

(21) Appl. No.: 16/926,171

(22) Filed: Jul. 10, 2020

(65) Prior Publication Data

US 2021/0014401 A1    Jan. 14, 2021

(30) Foreign Application Priority Data

Jul. 10, 2019    (CN) .......................... 201910620060.6

(51) Int. Cl.
*H04N 5/235*    (2006.01)
*G01B 11/02*    (2006.01)

(52) U.S. Cl.
CPC ......... *H04N 5/2354* (2013.01); *G01B 11/026* (2013.01); *H04N 5/2351* (2013.01); *H04N 5/2353* (2013.01)

(58) Field of Classification Search
CPC .. H04N 5/2354; H04N 5/2351; H04N 5/2353; H04N 5/2256; H04N 5/232; G01B 11/026; G01B 11/24; G01S 17/10; G01S 17/894
See application file for complete search history.

(56) References Cited

U.S. PATENT DOCUMENTS

| | | | |
|---|---|---|---|
| 5,157,451 A | 10/1992 | Taboada et al. | |
| 8,471,895 B2 | 6/2013 | Banks | |
| 9,007,439 B2 * | 4/2015 | Banks ................... | G01S 7/4865 348/46 |
| 9,405,171 B2 | 8/2016 | Grasser | |
| 10,440,294 B1 * | 10/2019 | Wan ........................ | H04N 7/18 |
| 2015/0338509 A1 | 11/2015 | Lange | |
| 2017/0123067 A1 * | 5/2017 | Van Der Tempel .... | G01S 17/10 |
| 2018/0146186 A1 * | 5/2018 | Akkaya .................... | G01S 1/00 |
| 2019/0208183 A1 * | 7/2019 | Schmidt ............... | H04N 13/271 |

* cited by examiner

*Primary Examiner* — Luong T Nguyen
(74) *Attorney, Agent, or Firm* — Loeb & Loeb LLP

(57) ABSTRACT

The present disclosure provides a three-dimensional distance measuring method and device. The three-dimensional distance measuring method includes: emitting a first light pulse to illuminate a scene, and acquiring a first image of the scene within a first exposure time; emitting a second light pulse to illuminate the scene, and acquiring a second image of the scene within a second exposure time; acquiring scene distance information of the scene based on the first image of the scene and the second image of the scene, wherein the ratio of the first pulse envelope of the first light pulse to the second pulse envelope of the second light pulse is a monotonic function of time.

11 Claims, 6 Drawing Sheets

THREE-DIMENSIONAL DISTANCE MEASURING METHOD AND DEVICE

CROSS REFERENCE OF RELATED APPLICATIONS

The present application claims the priority of Chinese patent application No. 201910620060.6, on Jul. 10, 2019, the entire content of these applications are incorporated into the present application by reference herein.

TECHNICAL FIELD

This present disclosure relates to the field of distance measurement with optical means; more particularly, to a three-dimensional distance measuring method and a three-dimensional distance measuring device.

BACKGROUND

With the emergence of applications such as autonomous driving, 3D audio and video games, smart phone navigation, and intelligent robots, it is becoming more and more important to accurately determine the depth information of the scene in real time.

Currently, there are various methods for measuring the depth of a scene. The distance resolution of the traditional triangulation method degrades continuously with the increase of distance. With the development of laser technology, it is common to use lasers to measure the depth of a scene. One method is transmitting a modulated optical signal to the scene, receiving the light reflected by the objects in the scene, and then determining the distance of the objects in the scene by demodulating the received light. Since this is a point-to-point measurement method, it requires a lot of scanning to obtain the depth information of the scene, and its spatial resolution is limited. Another method utilizes illumination of a scene with light of a predetermined lighting pattern, and uses the calibration information obtained in advance to obtain depth information of the scene. In addition, another method is time-of-flight ranging, which emits a modulated signal and uses four sensors associated with a single photosensitive pixel at four different phases of the modulated signal to obtain the relative phase of the returned signal relative to the transmitted signal, and then uses the difference in phase to determine the depth information.

These existing distance measuring methods generally require dedicated hardware configurations. The ranging equipment is bulky, and the spatial resolution of the ranging is low, or the ranging field of view is narrow, or the test distance is short.

SUMMARY

The present disclosure has been made to address the above problems. The present disclosure provides a three-dimensional distance measuring method and a three-dimensional distance measuring device.

According to an aspect of the present disclosure, there is provided a three-dimensional distance measurement method, comprising: emitting a first light pulse to illuminate a scene, and acquiring a first image of the scene within a first exposure time; emitting a second light pulse to illuminate the scene, and acquiring a second image of the scene within a second exposure time; acquiring scene distance information of the scene based on the first image of the scene and the second image of the scene, wherein the ratio of a first pulse envelope of the first light pulse to a second pulse envelope of the second light pulse is a monotonic function of time.

According to another aspect of the present disclosure, there is provided a three-dimensional distance measurement method, comprising: emitting a first light pulse to illuminate a scene, and acquiring a first image of the scene within a first exposure time, and recording a first light emission start time and a first light emission end time of the first light pulse, and a first exposure start time and a first exposure end time of the first exposure time; emitting a second light pulse to illuminate the scene, and acquiring a second image of the scene within a second exposure time, and recording a second light emission start time and a second light emission end time of the second light pulse, and a second exposure start time and a second exposure end time of the second exposure time; acquiring scene distance information of the scene based on the first image of the scene and the second image of the scene, the first light emission start time, the first light emission end time, the first exposure start time and the first exposure end time, and the second light emission start time, the second light emission end time, the second exposure start time and the second exposure end time, wherein the first exposure time and the second exposure time are on the same order of magnitude as light pulse duration of the first light pulse and the second light pulse.

Furthermore, the three-dimensional distance measurement method according to the present disclosure, further comprising: controlling the first exposure time so that during the first exposure time all light pulses returned from the objects in the scene are non-zero at any moment of the first exposure time; and controlling the second exposure time so that during the second exposure time all light pulses returned from the objects in the scene are non-zero at any moment between the second exposure start time and a specific moment before the end of exposure, and all are zero after the specific moment.

Furthermore, the three-dimensional distance measurement method according to the present disclosure, wherein the scene distance information is the distance information of each pixel corresponding to the portion of the objects in the image, respectively.

Furthermore, the three-dimensional distance measurement method according to the present disclosure, it is controlled to acquire the 2D image of the scene and the corresponding distance information simultaneously.

Furthermore, the three-dimensional distance measurement method according to the present disclosure further comprising: either before the emission of the first light pulse, or after the emission of the second light pulse, or between the emission of the first light pulse and the emission of the second light pulse, acquiring a background image of the scene within a background exposure time, wherein acquiring scene distance information of the scene based on the first image of the scene and the second image of the scene including: acquiring scene distance information of the scene based on the background image, the first image of the scene and the second image of the scene.

Furthermore, the three-dimensional distance measurement method according to the present disclosure, wherein acquiring scene distance information of the scene based on the first image of the scene and the second image of the scene including: based on a background image of previous frame or multiple frames, determining the background image for a current frame, acquiring scene distance information of the scene based on the background image, the first image of the scene and the second image of the scene.

Furthermore, the three-dimensional distance measurement method according to the present disclosure, further comprising: controlling emission sequence of the first light pulse and the second pulse light, and controlling the first exposure time to meet a first predetermined duration so that at least a portion of reflected and/or scattered signals of the first light pulse from the objects in the scene are used to acquire the first image of the scene, and controlling the second exposure time to meet a second predetermined duration so that at least a portion of reflected and/or scattered signals of the second light pulse from the objects in the scene are used to acquire the second image of the scene.

Furthermore, the three-dimensional distance measurement method according to the present disclosure, wherein the first light pulse and the second light pulse are emitted simultaneously, and the first light pulse has a first wavelength and the second light pulse has a second wavelength, the first wavelength is different from the second wavelength.

Furthermore, the three-dimensional distance measurement method according to the present disclosure, wherein the first light pulse is controlled to have a first polarization state, the second light pulse has a second polarization state, and the first polarization state is different from the second polarization state.

Furthermore, the three-dimensional distance measurement method according to the present disclosure further comprising: emitting a plurality of third light pulses to illuminate the scene, and acquiring a plurality of third images of the scene within a plurality of corresponding third exposure times; wherein acquiring scene distance information of the scene based on the first image of the scene and the second image of the scene includes: acquiring scene distance information of the scene based on the first image of the scene, the second image of the scene and the plurality of third images of the scene, and wherein the first light pulse has a first wavelength, the second light pulse has a second wavelength, the plurality of third light pulses has a plurality of third wavelengths, and the first wavelength, the second wavelength and the plurality of third wavelengths are different from each other.

Furthermore, the three-dimensional distance measurement method according to the present disclosure, wherein the first light pulse and/or the second light pulse have a non-uniform spatial intensity distribution.

Furthermore, the three-dimensional distance measurement method according to the present disclosure, wherein the first exposure time and the second exposure time are respectively 1 to 5 times the light emission duration of the first light pulse and the second light pulse.

Furthermore, the three-dimensional distance measurement method according to the present disclosure, wherein the background scene image, the first image of the scene, the second image of the scene, and the third images of the scene are acquired by a CCD or CMOS OR APD/SPAD ARRAY imaging sensor.

According to yet another aspect of the present disclosure, there is provided a three-dimensional distance measuring device comprising: a light source unit configured to emit a first light pulse and a second light pulse to illuminate a scene; an imaging unit configured to acquire a first image of the scene within a first exposure time, and to acquire a second image of the scene within a second exposure time; a processing unit configured to acquire distance information of the scene based on the first image of the scene and the second image of the scene, wherein the ratio of the first pulse envelope of the first light pulse to the second pulse envelope of the second light pulse is a monotonic function of time.

According to still another aspect of the present disclosure, there is provided a three-dimensional distance measuring device comprising: a light source unit configured to emit a first light pulse and a second light pulse to illuminate a scene, to record a first light emission start time and a first light emission end time of the first light pulse, and to record a second light emission start time and a second light emission end time of the second light pulse; an imaging unit configured to acquire a first image of the scene within a first exposure time, and to acquire a second image of the scene of the scene within a second exposure time, and record a first exposure start time and a first exposure end time of the first exposure time, and a second exposure start time and a second exposure end time of the second exposure time; a processing unit configured to acquire distance information of the scene based on the first image of the scene and the second image of the scene, the first light emission start time, the first light emission end time, the first exposure start time and the first exposure end time, and the second light emission start time, the second light emission end time, the second exposure start time and the second exposure end time, wherein the first exposure time and the second exposure time are on the same order of magnitude as light pulse duration of the first light pulse and the second light pulse.

Furthermore, the three-dimensional distance measuring device according to the present disclosure, wherein the imaging unit is configured to control the first exposure time so that during the first exposure time all light pulses returned from the objects in the scene are non-zero at any moment of the first exposure time; and the imaging unit is configured to control the second exposure time so that during the second exposure time all light pulses returned from the objects in the scene are non-zero at any moment between the second exposure start time and a specific moment before the end of exposure, and all are zero after the specific moment.

Furthermore, the three-dimensional distance measuring device according to the present disclosure, wherein the scene distance information is the distance information of the corresponding portion of the objects in the scene represented by the pixels of the image, respectively.

Furthermore, the three-dimensional distance measurement device according to the present disclosure, wherein the imaging unit and the processing unit acquire the 2D image of the scene and the corresponding distance information simultaneously.

Furthermore, the three-dimensional distance measurement device according to the present disclosure, wherein the imaging unit is configured to either before the emission of the first light pulse, or after the emission of the second light pulse, or between the emission of the first light pulse and the emission of the second light pulse, acquire a background image of the scene within a background exposure time, wherein the processing unit is configured to acquire scene distance information of the scene based on the background image of the scene, the first image of the scene and the second image of the scene.

Furthermore, the three-dimensional distance measurement device according to the present disclosure, wherein the processing unit is configured to determine the background image for a current frame based on a background image of previous frame or multiple frames, and acquire scene distance information of the scene based on the background image of the scene, the first image of the scene and the second image of the scene.

Furthermore, the three-dimensional distance measurement device according to the present disclosure, wherein the light source unit is configured to sequentially emit the first light pulse and the second light pulse, and the imaging unit is configured to control the first exposure time to meet a first predetermined duration so that at least a portion of reflected and/or scattered signals of the first light pulse from the objects in the scene are used to acquire the first image of the scene, and the imaging unit is configured to control the second exposure time to meet a second predetermined duration so that at least a portion of reflected and/or scattered signals of the second light pulse from the objects in the scene are used to acquire the second image of the scene.

Furthermore, the three-dimensional distance measurement device according to the present disclosure, wherein the light source unit simultaneously emits the first light pulse and the second light pulse, and the first light pulse has a first wavelength, the second light pulse has a second wavelength, and the said first wavelength is different from the said second wavelength.

Furthermore, the three-dimensional distance measurement device according to the present disclosure, wherein the light source unit controls the first light pulse to have a first polarization state, the second light pulse to have a second polarization state, and the first polarization state is different from the second polarization state.

Furthermore, the three-dimensional distance measurement device according to the present disclosure, the light source unit is configured to emit a plurality of third light pulses to illuminate the scene, and the imaging unit is configured to acquire a plurality of third images of the scene within a plurality of corresponding third exposure times; wherein the processing unit is configured to acquire distance information of the scene based on the first image of the scene, the second image of the scene, and the plurality of third the scene images, and wherein the first light pulse has a first wavelength, the second light pulse has a second wavelength, the plurality of third light pulses has a plurality of third wavelengths, and the first wavelength, the second wavelength and the plurality of third wavelengths are different from each other.

Furthermore, the three-dimensional distance measurement device according to the present disclosure, wherein the first light pulse and/or the second light pulse have a non-uniform spatial intensity distribution.

Furthermore, the three-dimensional distance measurement device according to the present disclosure, wherein the first exposure time and the second exposure time are respectively 1 to 5 times the light emission duration of the first light pulse and the second light pulse.

Furthermore, the three-dimensional distance measurement device according to the present disclosure, wherein the imaging unit includes CCD and/or CMOS OR APD/SPAD ARRAY imaging sensor.

As will be described in detail below, the three-dimensional distance measuring method and the three-dimensional distance measuring device according to the embodiments of the present disclosure use standard CCD or CMOS OR APD/SPAD ARRAY image sensors with controlled illumination and sensor exposure to obtain images to achieve the accurate and real-time depth information acquisition without the need for scanning and the narrow field-of-view restrictions. In addition, no additional mechanical components are used, and the devices such as CCD or CMOS OR APD/SPAD ARRAY can be mass-produced, thereby increasing the reliability and stability of the system while reducing costs.

It is to be understood that both the foregoing general description and the following detailed description are exemplary, and are intended to provide further explanation of the claimed technology.

BRIEF DESCRIPTION OF THE DRAWINGS

By describing the embodiments of the present disclosure in more detail in conjunction with the accompanying drawings, the above claims and other objects, features, and advantages of the present disclosure will become more apparent. The drawings are used to provide a further understanding of the embodiments of the present disclosure, and constitute a part of the specification, and are used to explain the present disclosure together with the embodiments of the present disclosure, and do not constitute a limitation on the present disclosure. In the drawings, the same reference numerals generally represent the same components or steps.

DETAILED DESCRIPTION OF THE EMBODIMENTS

In order to make the objectives, technical solutions, and advantages of the present disclosure more apparent, example embodiments according to the present disclosure will be described in detail below with reference to the drawings. Obviously, the described embodiments are only a part of the embodiments of the present disclosure, but not all the embodiments of the present disclosure, and it shall be understood that the present disclosure is not limited by the example embodiments described herein.

Figure 1:
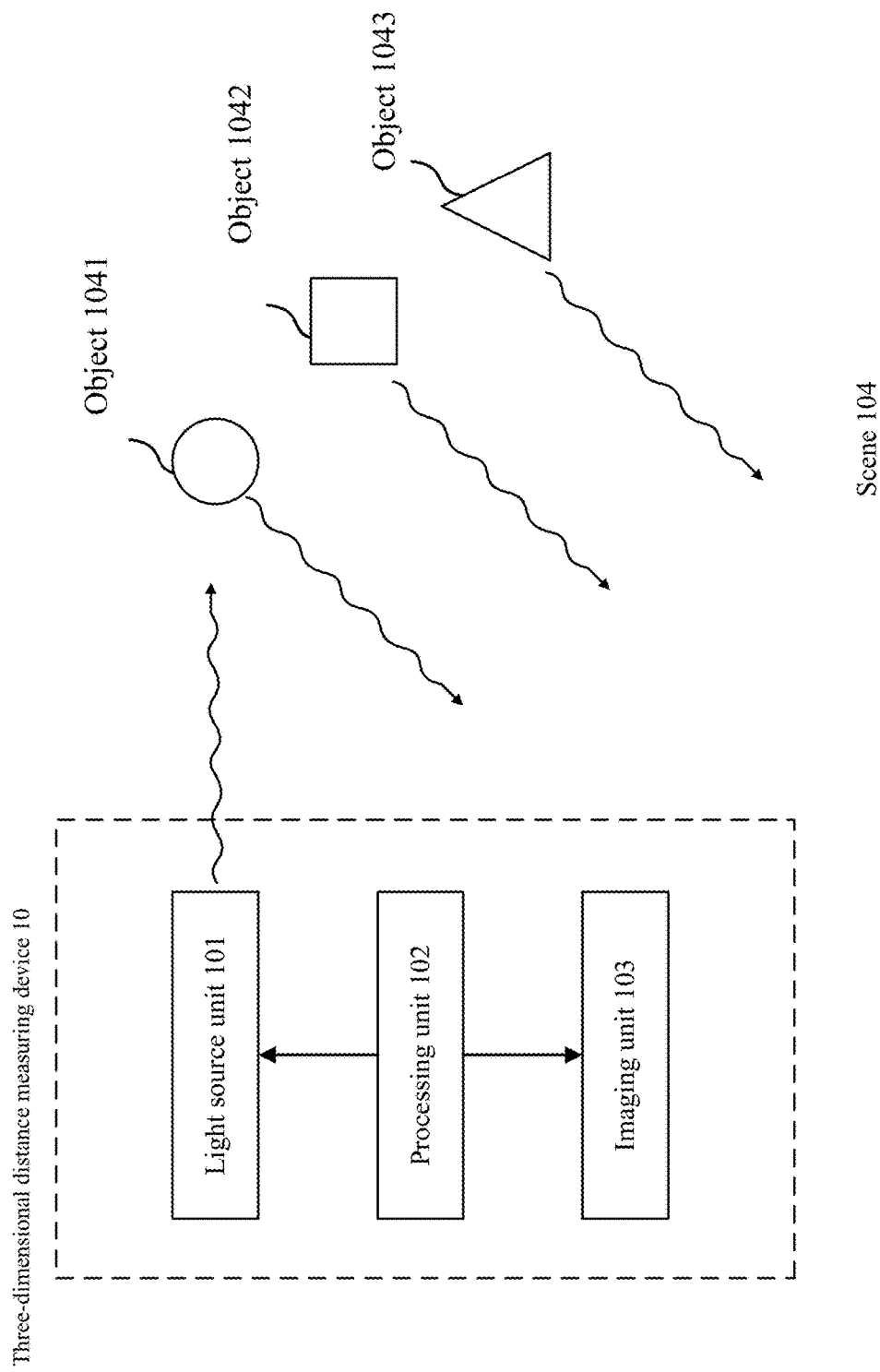
FIG. 1 is a schematic diagram summarizing an application scenario of a three-dimensional distance measuring method and a three-dimensional distance measuring device according to an embodiment of the present disclosure.

First, the application scenario of the present disclosure is schematically described with reference to FIG. 1. FIG. 1 is a schematic diagram summarizing an application scenario of a three-dimensional distance measuring method and a three-dimensional distance measuring device according to an embodiment of the present disclosure.

As shown in FIG. 1, the three-dimensional distance measuring device 10 according to an embodiment of the present disclosure performs distance measurement on the scene 104. In one embodiment of the present disclosure, the three-dimensional distance measuring device 10 is configured in an automatic driving system. The three-dimensional distance measuring device 10 measures the relative distance of objects in the driving scene of the vehicle (for example, street, highway, etc.), and the obtained distance information of the scene will be used for unmanned driving positioning, driving area detection, lane mark line detection, obstacle detection, dynamic object tracking, obstacle classification and recognition and other functions. In another embodiment of the present disclosure, the three-dimensional distance measuring device 10 is configured in an AR/VR video game system. The three-dimensional distance measuring device 10 performs scene distance information measurement on the environment where the user is located, so as to accurately locate the user's position in the three-dimensional space and enhance the sense of actual experience used in the game. In another embodiment of the present disclosure, the three-dimensional distance measuring device 10 is configured in an intelligent robot system. The three-dimensional distance measuring device 10 performs scene distance information measurement on the working environment where the robot is located, thereby implementing modeling of the working environment where the robot is located and intelligent path planning of the robot.

As schematically shown in FIG. 1, the three-dimensional distance measuring device 10 according to an embodiment of the present disclosure includes a light source unit 101, a processing unit 102 and an imaging unit 103. The light source unit 101 may, for example, emit light pulses λ in a controlled manner to illuminate the scene 104. The imaging unit 103 receives the reflected or refracted optical signal of the light pulse λ on the objects 1041, 1042, 1043 at different positions in the scene 104 within a specific exposure time, thereby obtaining the image of the scene 104.

The processing unit 102 controls the light emission of the light source unit 101 and the imaging of the imaging unit 103, and determines the distance information of the scene 104 based on the images of the scene obtained by the imaging unit 103. In an embodiment of the present disclosure, the scene distance information is distance information from each pixel to a corresponding part in the scene image. That is, the three-dimensional distance measuring method and the three-dimensional distance measuring device according to the present disclosure achieve a pixel-level distance information acquisition. In addition, the three-dimensional distance measuring method and the three-dimensional distance measuring device according to the present disclosure simultaneously acquire a scene 2D image and a corresponding scene distance information.

As will be described in detail below, in an embodiment of the present disclosure, the processing unit 102 may control the light source unit 101 to continuously emit illumination light, where the continuously emitted illumination light may be an ordinary laser, or may be polarized light of different or same polarizations. The processing unit 102 can also control the light source unit 101 to simultaneously emit illumination light of different wavelengths and/or different polarizations. In addition, the processing unit 102 may control the light source unit 101 to emit illumination light having a non-uniform spatial intensity distribution. Correspondingly, the processing unit 102 can control the imaging unit 103 to image the scene 104 for the continuously emitted illumination light. The processing unit 102 may also control the imaging unit 103 to image the scene 104 using illumination lights that are simultaneously emitted with different wavelengths and/or different polarizations. In one embodiment, the imaging unit 103 may include a general-purpose charged coupled device (CCD), complementary metal-oxide semiconductor (CMOS), or photodiodes and avalanche photo-diodes/single-photon avalanche diode (APD/SPAD) ARRAY imaging sensor, for example.

In addition, as will be described in detail below, since the three-dimensional distance measuring method and the three-dimensional distance measuring device according to the embodiments of the present disclosure acquire the scene distance information of the scene 104 by imaging the scene 104 multiple times. The entire imaging process does not need to control the light source unit 101 to scan the scene 104. Therefore, the operation process is simplified, and the mechanical defects in the prior art are overcome.

In addition, it should be understood that the specific parameters of the light source unit 101 and the imaging unit 103 will not constitute limitations on the scope of the present application, and any light source unit and imaging unit capable of implementing the three-dimensional distance measuring method according to the embodiments of the present disclosure are included within the scope of this disclosure.

Figure 2:
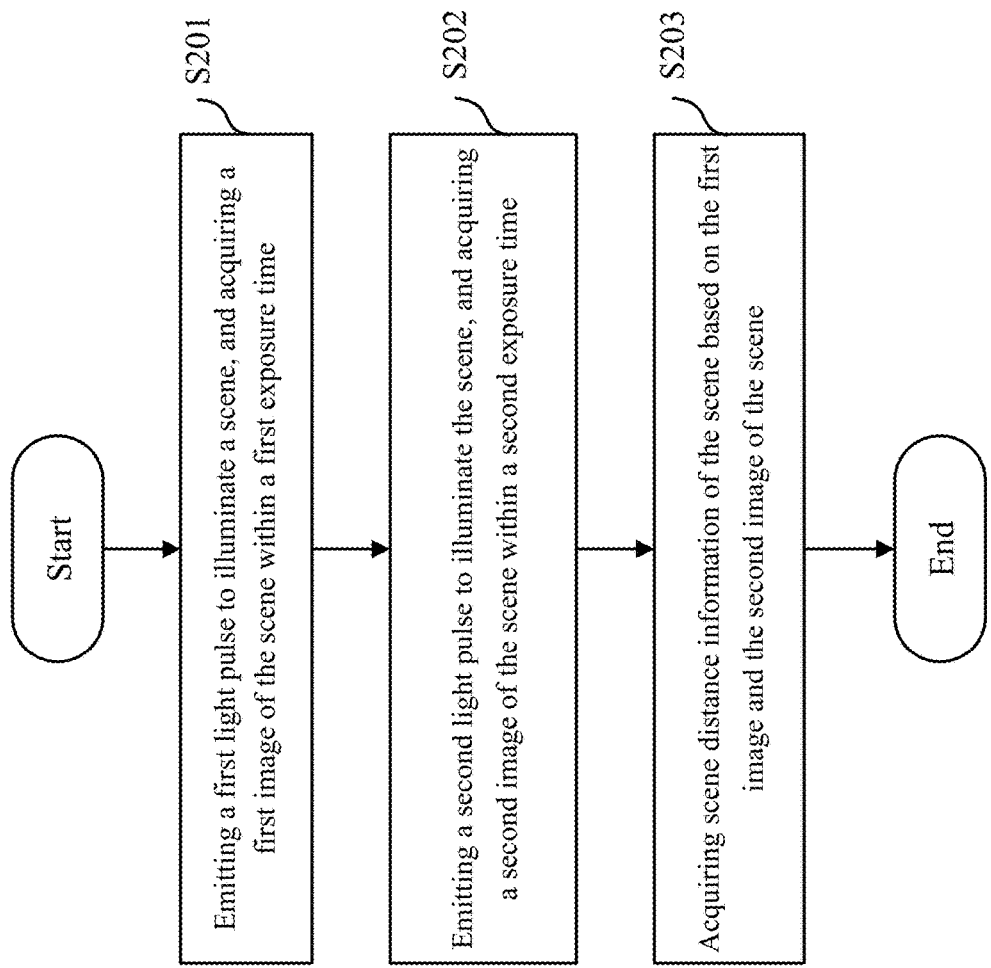
FIG. 2 is a flowchart illustrating a three-dimensional distance measuring method according to an embodiment of the present disclosure.
Figure 3:
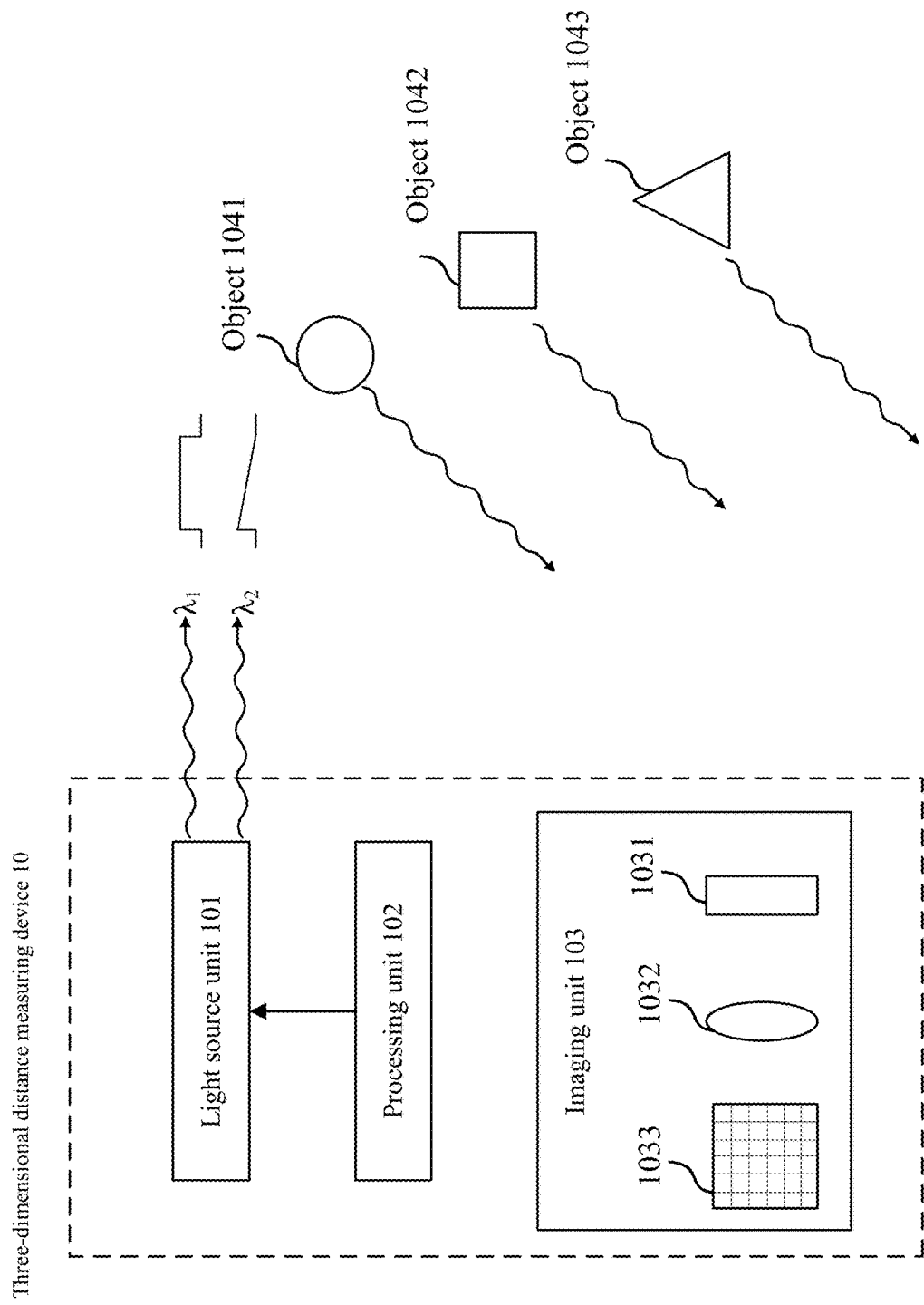
FIG. 3 is a schematic diagram further illustrating an application scenario of a three-dimensional distance measuring method and a three-dimensional distance measuring device according to an embodiment of the present disclosure.
Figure 4:
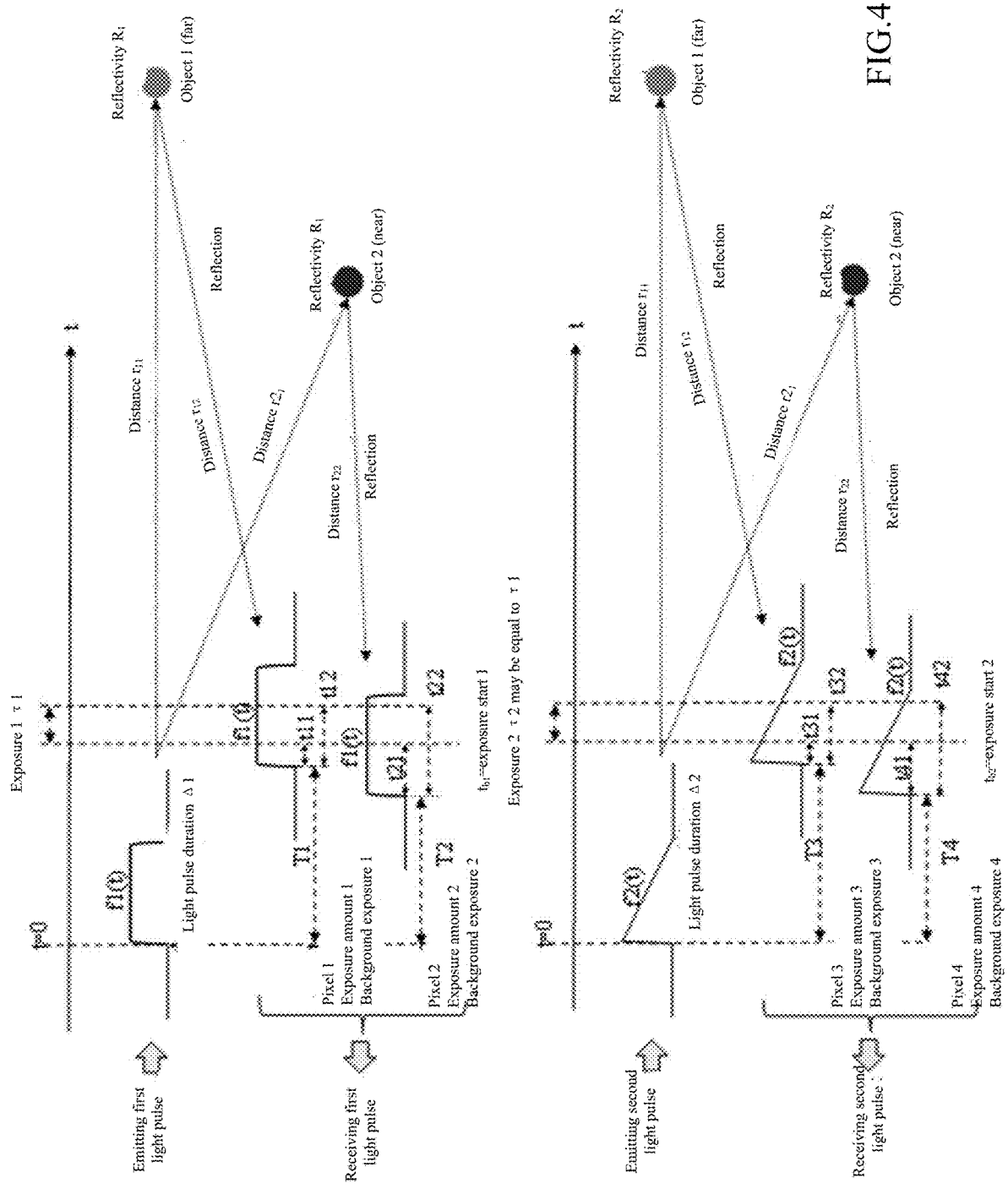
FIG. 4 is a timing chart illustrating the emission light signal and the imaging signal of the three-dimensional distance measuring method according to an embodiment of the present disclosure.
Figure 5:
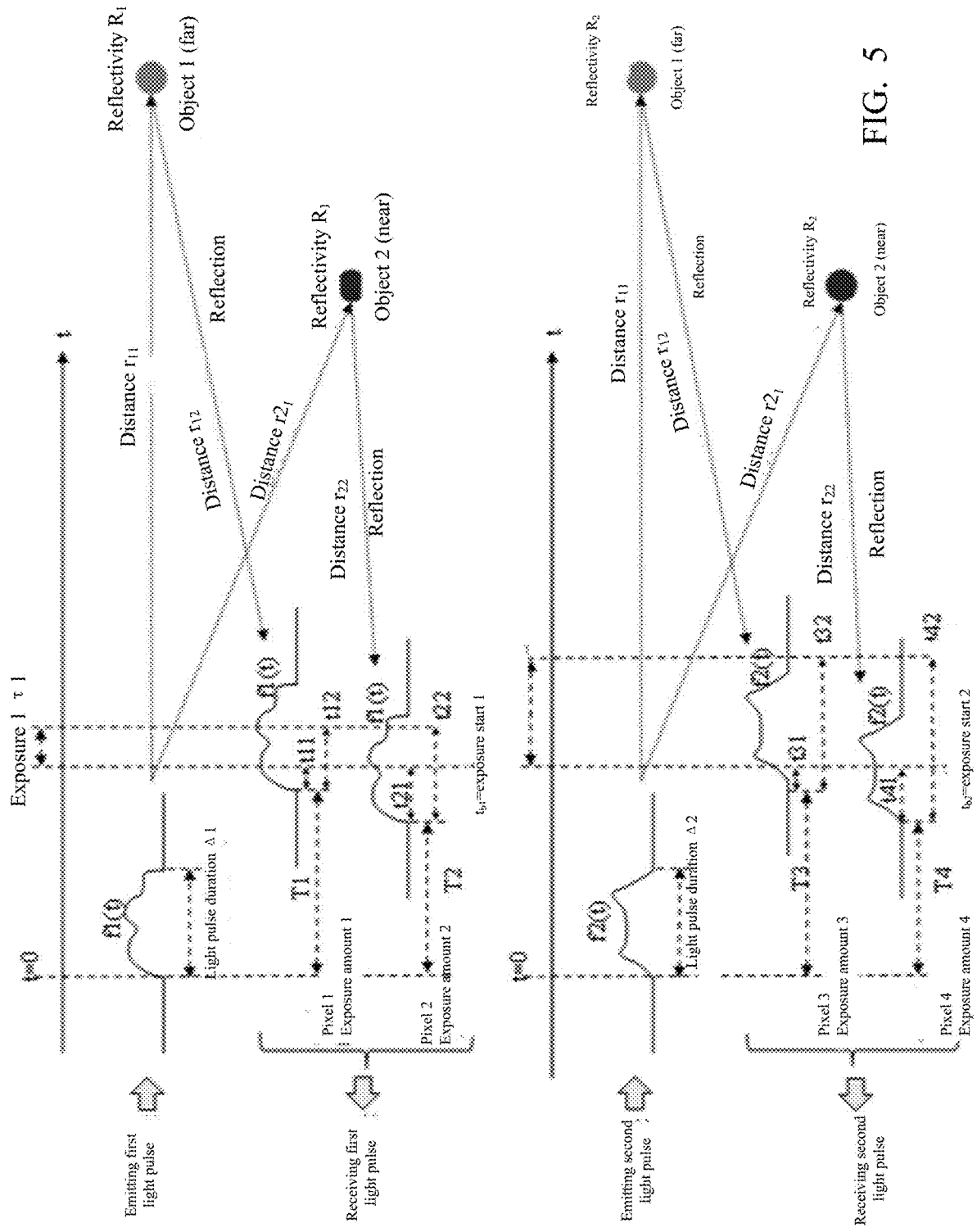
FIG. 5 is another timing chart illustrating the emission light signal and the imaging signal of the three-dimensional distance measuring method according to an embodiment of the present disclosure.

Hereinafter, a three-dimensional distance measuring method according to an embodiment of the present disclosure will be described in further detail with reference to FIGS. 2 to 5. FIG. 2 is a flowchart illustrating a three-dimensional distance measuring method according to an embodiment of the present disclosure. FIG. 3 is a schematic diagram further illustrating an application scenario of a three-dimensional distance measuring method and device according to an embodiment of the present disclosure. FIG. 4 and FIG. 5 are timing charts illustrating the emission light signal and the imaging signal of the three-dimensional distance measuring method according to an embodiment of the present disclosure.

As shown in FIG. 2, the three-dimensional distance measuring method according to an embodiment of the present disclosure includes the following steps.

In step S201, a first light pulse is emitted to illuminate the scene, and a first image of the scene is acquired within a first exposure time.

In step S202, a second light pulse is emitted to illuminate the scene, and a second image of the scene is acquired within a second exposure time.

In step S203, based on the first image of the scene and the second image of the scene, scene distance information of the scene is obtained.

It should be noted that the process shown in FIG. 2 does not consider the ideal situation of the background light in the scene. In the practical applications, in order to achieve more accurate distance measurement, the contribution of background light to the light pulse imaging process for distance measurement also needs to be considered, and the influence of background light should be removed from the acquired scene image. In other words, after acquiring the background image of the scene, step S203 may be expressed as acquiring scene distance information of the scene based on the background image of the scene, the first image of the scene, and the second image of the scene.

In an embodiment of the present disclosure, before emitting the first light pulse, or after emitting the second light pulse, or between emitting the first light pulse and the second light pulse, the background image of the scene is acquired within the exposure time. The acquisition of the background image of the scene may be performed every time the scene image under light pulse illumination is acquired, or before the scene image under light pulse illumination is acquired. Alternatively, for scene distance measuring of consecutive multiple frames, the background image of the current frame is determined based on the background image of the previous frame or multiple frames. For example, the change probability of the background image of the current frame can be predicted based on the change amount of the background image of the previous frame; or the change probability of the background image of the current frame can be predicted based on the change amount of the scene image under the current light pulse illumination and the scene image under the previous light pulse illumination, so that when the change possibility of the scene image is large, the background image acquisition process is performed again. Conversely, in the case where the change possibility of the scene image is not large, the background image of the previous frame or multiple frames can be used as the background image of the current frame.

In the embodiment of the present disclosure, the above steps S201 and S202 may be performed sequentially or may be performed simultaneously. That is, the first light pulse and the second light pulse may be sequentially emitted, or the first light pulse and the second light pulse may be simultaneously emitted.

As shown in FIG. 3, the first optical pulse $\lambda 1$ is, for example, a square wave with an optical pulse envelope that does not change with time, and the second optical pulse $\lambda 2$ is, for example, a monotonically falling ramp wave with an optical pulse envelope that is modulated with time. Alternatively, the first optical pulse $\lambda 1$ may also be a falling or rising ramp wave with an optical pulse envelope that is modulated with time, and the second optical pulse $\lambda 2$ is a different rising or falling ramp wave. That is, in the three-dimensional distance measuring method according to the embodiment of the present disclosure, the ratio of the first pulse envelope of the first optical pulse $\lambda 1$ to the second pulse envelope of the second optical pulse $\lambda 2$ needs to be a monotonic function of time. This monotonic functional relationship between the first pulse envelope of the first optical pulse $\lambda 1$ and the second pulse envelope of the second optical pulse $\lambda 2$ will be recorded for the subsequent scene distance information determination by the processing unit 102.

The first optical pulse $\lambda 1$ and the second optical pulse $\lambda 2$ may have the same or different wavelengths and the same or different polarization directions. The imaging unit 103 may further include a band-pass filter and/or polarizer 1031, a lens 1032, and an image sensor 1033. For example, in the case of sequentially or simultaneously emitting the first light pulse and the second light pulse, the band-pass filter and/or the polarizer 1031 can be controlled to allow the imaging light of a specific wavelength or polarization direction to pass, so as to achieve scene imaging corresponding to the different imaging light pulses and background light. In addition, the image sensor 1033 is configured by a CCD or CMOS OR APD/SPAD ARRAY image sensor or a focal plane array.

More specifically, in order to implement the three-dimensional distance measuring method according to an embodiment of the present disclosure, it is necessary to control a first light emission start time and a first light emission end time of the first light pulse and a first exposure start time of a first exposure end time of the first exposure, a second light emission start time and a second light emission end time of the second light pulse, and a second exposure start time and a second exposure end time of the second exposure time, and t the envelope ratio of a first pulse envelope of the optical pulse and a second pulse envelope of the second optical pulse. In one embodiment of the present disclosure, the first exposure time and the second exposure time are on the same order of magnitude as the light emission durations of the first light pulse and the second light pulse. More specifically, the first exposure time and the second exposure time are respectively 1 to 5 times the light emission durations of the first light pulse and the second light pulse.

Hereinafter, with reference to FIGS. 4 and 5, the details regarding controlling the first light emission start time and the first light emission end time of the first light pulse, the first exposure start time and the first exposure end time of the first exposure time, the second light emission start time and the second light emission end time of the second light pulse, the second exposure start time and the second exposure end time of the second exposure time, and the envelope ratio of the first pulse envelope of the first pulse of the first light pulse and the second pulse envelope of the second light pulse to perform distance measuring will be described in further detail.

As shown in FIG. 4, the first optical pulse is emitted at time $t=0$, the duration of the first optical pulse is $\Delta 1$, and the optical pulse envelope of the first optical pulse is $f1(t)$. That is, $t=0$ is the first light emission start time, and $\Delta 1$ is the first light emission end time. In the scene, two objects are schematically shown, namely an object 1 at a relatively far distance and an object 2 at a relatively close distance, and it is assumed that the surface reflectances of the objects are R1 and R2, respectively. For the object 1, starting from time T1, the first light pulse reflected by the object 1 begins to return. (T1+t11) is the first exposure start time (that is, tb1 in the figure), and (T1+t12) is the first exposure end time. For the object 2, starting from time T2, the first light pulse reflected by the object 2 begins to return. (T2+t21) is the first exposure start time (that is, tb1 in the figure), and (T2+t22) is the first exposure end time. The difference between the first exposure start time and the first exposure end time is the first exposure time $\tau 1$ for the first light pulse. In addition, for the object 1, the distances for the emission and reflection of the first light pulse are r11 and r12, respectively; for the object 2, the distances for the emission and reflection of the first light pulse are r21 and r22, respectively.

Similarly, the second optical pulse is emitted at time $t=0$, the duration of the second optical pulse is $\Delta 2$, and the optical pulse envelope of the second optical pulse is $f2(t)$. That is, $t=0$ is the second light emission start time, and $\Delta 2$ is the second light emission end time. It should be understood that showing the first light pulse and the second light pulse as being emitted at time $t=0$ is only schematic, but in fact the first light pulse and the second light pulse may be emitted at the same time or in different emission order. For object 1, starting from time T3, the second light pulse reflected by object 1 begins to return. (T3+t31) is the second exposure start time (that is, tb2 in the figure), and (T3+t32) is the second exposure end time. For object 2, starting from time T4, the second light pulse reflected by object 2 begins to return. (T4+t41) is the second exposure start time (that is, tb2 in the figure), and (T4+t42) is the second exposure end time. The difference between the second exposure start time and the second exposure end time is the second exposure time $\tau 2$ for the second light pulse, and the second exposure time $\tau 2$ of the second light pulse may be equal to the first exposure time it of the first light pulse. In addition, for the object 1, the distances for the emission and reflection of the second light pulse are r11 and r12; for the object 2, the distances for the emission and reflection of the second light pulse are r21 and r22, respectively.

In this way, the exposure amounts 1 and 2 of the first light pulse to the pixel 1 on the object 1 and the pixel 2 on the object 2 can be expressed as:

$$\text{Exposure amount 1} = \frac{R_1 \cdot \int_{T1+t11}^{T1+t12} f1(t) \cdot dt}{C_1 \cdot \pi \cdot (r11 + r12)^4} \quad \text{Eq. 1}$$

$$\text{Exposure amount 2} = \frac{R_2 \cdot \int_{T2+t21}^{T2+t22} f1(t) \cdot dt}{C_2 \cdot \pi \cdot (r21 + r22)^4} \quad \text{Eq. 2}$$

The exposures 3 and 4 of the second light pulse to the pixel 1 on the object 1 and the pixel 2 on the object 2 can be expressed as:

$$\text{Exposure amount 3} = \frac{R_1 \cdot \int_{T3+t31}^{T3+t32} f2(t) \cdot dt}{C_1 \cdot \pi \cdot (r11 + r12)^4} \quad \text{Eq. 3}$$

$$\text{Exposure amount 4} = \frac{R_2 \cdot \int_{T2+t41}^{T2+t42} f2(t) \cdot dt}{C_2 \cdot \pi \cdot (r21 + r22)^4} \quad \text{Eq. 4}$$

Among them, C1 and C2 are constants, which are spatially related to pixels 1 and 2 and have nothing to do with time. It is easy to understand that the image output values obtained by imaging for pixel 1 and pixel 2 are proportional to the respective exposure amounts.

In an embodiment of the present disclosure, the first exposure time is controlled to satisfy a first predetermined duration, so that at least a portion of the first light pulse reflected through each point in the scene can be used to acquire the image of the first scene in the first the exposure time, and the second exposure time is controlled to satisfy a second predetermined duration, so that at least a portion of the second light pulse reflected through each point in the scene can be used to acquire the second image of the scene in the second exposure time. That is, as shown in FIG. 4, the first exposure start time tb1, the second exposure start time tb2, the first exposure time τ1, the second exposure time r2, the first light pulse duration Δ1 and the second light pulse duration Δ2 are controlled, and the areas it and r2 where the return pulses of the pixel 1 and the pixel 2 overlap are selected to perform exposure.

For a pixel 1 or a pixel 2, in the ideal case without considering the background light exposure, the exposure amount ratio g of the two exposures by the first light pulse and the second light pulse is expressed as:

$$g_1(D) = \frac{\text{Exposure amount 1}}{\text{Exposure amount 2}} = \frac{\int_{T1+t11}^{T1+t12} f1(t) \cdot dt}{\int_{T3+t31}^{T3+t32} f2(t) \cdot dt} \quad \text{Eq. 5}$$

$$g_2(D) = \frac{\text{Exposuree amount 2}}{\text{Exposure amount 4}} = \frac{\int_{T2+t21}^{T2+t22} f1(t) \cdot dt}{\int_{T4+t41}^{T4+t42} f2(t) \cdot dt} \quad \text{Eq. 6}$$

If the background light exposure is considered, the exposure amount ratio g of the two exposures by the first light pulse and the second light pulse is expressed as:

$$g_1(D) = \frac{\text{Exposure amount 1} - \text{background exposure1}}{\text{Exposure amount 2} - \text{background exposure2}} = \quad \text{Eq. 7}$$

$$\frac{\int_{T1+t11}^{T1+t12} f1(t) \cdot dt - \text{background exposure 1}}{\int_{T3+t31}^{T3+t32} f2(t) \cdot dt - \text{background exposure 2}}$$

$$g_2(D) = \frac{\text{Exposure amount 2} - \text{background exposure2}}{\text{Exposure amount 4} - \text{background exposure4}} = \quad \text{Eq. 8}$$

$$\frac{\int_{T2+t21}^{T2+t22} f1(t) \cdot dt - \text{background exposure2}}{\int_{T4+t41}^{T4+t42} f2(t) \cdot dt - \text{background exposure4}}$$

T1 to T4 are all related to the distance D, t11, t12, t31, t32, t21, t22, t41, t42, it and τ2 are controllable parameters, and it is only needed to control f1 (t)/f2 (t) to be a monotonic change function, then g(D) becomes a monotonic function of distance D. Therefore, for a particular pixel, by measuring the two exposure amounts of the pixel, the distance information D of the pixel can be determined by the ratio of the two exposure amounts.

FIG. 5 shows another example for controlling the first light emission start time and the first light emission end time of the first light pulse, the first exposure start time and the first exposure end time of the first exposure time, the second light emission start time and the second light emission end time of the second light pulse, the second exposure start time and the second exposure end time of the second exposure time, and the envelope ratio of the first pulse envelope of the first light pulse and the second pulse envelope of the second light pulse.

Specifically, for the first light pulse, the first exposure start time tb1, the first exposure time τ1, the first light pulse duration Δ1 are controlled, and the region τ1 where the return pulses of the pixel 1 and the pixel 2 overlap is selected to perform the exposure. For the second light pulse, unlike the case shown in FIG. 4, the second exposure start time tb2, the second exposure time τ2, and the second light pulse duration Δ2 are controlled so that the tail of the reflected pulse for the furthest distance point is reached before the second exposure end time, and the earliest tail of the reflection pulse arrives at the same time as the second exposure start time. That is, the first exposure time setting is controlled so that all light pulses returned from the objects in the scene during the first exposure time are not zero at any time during the first exposure time; and the second exposure time setting is controlled so that during the second exposure time all light pulses returned from the objects in the scene are not zero at arbitrary moment between the second exposure start time and a specific moment before the end of exposure, and all are zero after the specific moment. In this way, the exposure amount ratio g of the double exposures by the first light pulse and the second light pulse is also a monotonic function of the distance D. Therefore, for a particular pixel, by measuring the two exposure amounts of the pixel, the distance information D of the pixel can be determined by the ratio of the two exposure amounts.

Figure 6:
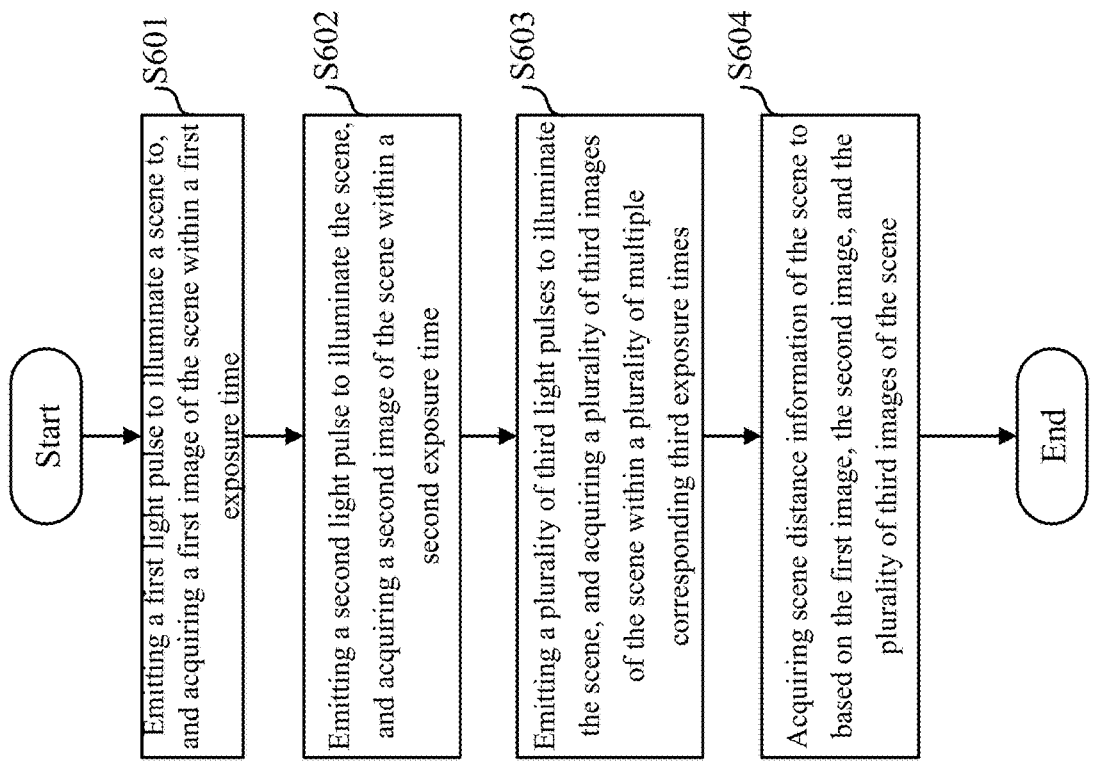
FIG. 6 is a flowchart illustrating a three-dimensional distance measuring method according to another embodiment of the present disclosure.

FIG. 6 is a flowchart illustrating a three-dimensional distance measuring method according to yet another embodiment of the present disclosure. Unlike the case where the first light pulse and the second light pulse are exposed twice as described in FIGS. 2 to 5, the three-dimensional distance measuring method according to yet another embodiment of the present disclosure may include more than two exposure cases.

As shown in FIG. 6, a three-dimensional distance measuring method according to yet another embodiment of the present disclosure includes the following steps.

In step S601, a first light pulse is emitted to illuminate the scene, and a first image of the scene is acquired within a first exposure time.

In step S602, a second light pulse is emitted to illuminate the scene, and a second image of the scene is acquired within a second exposure time.

In step S603, a plurality of third light pulses are emitted to illuminate the scene, and a plurality of third images of the scene are acquired within a plurality of corresponding third exposure times.

In step S604, based on the first image of the scene, the second image of the scene, and the plurality of third images of the scene, scene distance information of the scene is acquired.

The first optical pulse has a first wavelength, the second optical pulse has a second wavelength, the plurality of third optical pulses have a plurality of third wavelengths, and the first wavelength, the second wavelength, and the plurality of third wavelengths may be different from each other.

Above, a three-dimensional distance measuring method and device according to an embodiment of the present disclosure have been described with reference to the accompanying drawings. It uses a standard CCD or CMOS OR APD/SPAD ARRAY image sensor and the image is acquired through controllable laser illumination and sensor exposure. In this case, an accurate and real-time depth information acquisition is achieved without the limitations of scanning and narrow view field.

Those of ordinary skill in the art may realize that the units and algorithm steps of the examples described in conjunction with the embodiments disclosed herein can be implemented by electronic hardware, or a combination of computer software and hardware. Whether these functions are executed in hardware or software depends on the specific application of the technical solution and design constraints. Professional technicians can use different methods to implement the described functions for each specific application, but such implementation should not be considered beyond the scope of the present invention.

The basic principles of the present disclosure have been described above in conjunction with specific embodiments. However, it should be pointed out that the advantages, superiorities, effects, etc. mentioned in this disclosure are only examples and not limitations, and these advantages, superiorities, effects, etc. cannot be considered as requirement for all the embodiments of the present disclosure. In addition, the specific details disclosed above are only for the purpose of illustration and ease of understanding, rather than limitation, and the above details do not limit the disclosure to the implementation of the above specific details.

The block diagrams of the devices, apparatuses, devices, and systems involved in this disclosure are merely illustrative examples and are not intended to require or imply that they must be connected, arranged, and configured in the manner shown in the block diagrams. As those skilled in the art will recognize, these parts, devices, equipment, systems may be connected, arranged, and configured in any manner. Words such as "include", "comprise", "have", etc. are open-ended words that refer to "including but not limited to" and can be used interchangeably with them. The words "or" and "and" as used herein refer to the word "and/or" and can be used interchangeably unless the context clearly indicates otherwise. The word "such as" used herein refers to the phrase "such as but not limited to" and can be used interchangeably with it.

In addition, as used herein, "or" used in the enumeration of items beginning with "at least one" indicates a separate enumeration, so that, for example, an enumeration of "at least one of A, B, or C" means A or B or C, or AB or AC or BC, or ABC (ie A and B and C). Furthermore, the wording "exemplary" does not mean that the described examples are preferred or better than other examples.

In addition, as used herein, "or" used in the enumeration of items beginning with "at least one" indicates a separate enumeration, so that, for example, an enumeration of "at least one of A, B, or C" means A or B or C, or AB or AC or BC, or ABC (ie A and B and C). Furthermore, the wording "exemplary" does not mean that the described examples are preferred or better than other examples.

Various changes, substitutions, and alterations to the technology described herein may be made without departing from the technology taught by the appended claims. Furthermore, the scope of the claims of the present disclosure is not limited to the specific aspects of the processes, machines, manufacturing, event composition, means, methods, and actions described above. The compositions, means, methods, or actions of processes, machines, manufacturing, events that currently exist or that will be developed later can be utilized to perform substantially the same functions or achieve substantially the same results as the corresponding aspects described herein. Accordingly, the appended claims include within their scope the composition, means, method, or action of such a process, machine, manufacturing, event.

The above description of the disclosed aspects is provided to enable any person skilled in the art to make or use the present disclosure. Various modifications to these aspects are very obvious to those skilled in the art, and the general principles defined herein can be applied to other aspects without departing from the scope of the present disclosure. Therefore, the present disclosure is not intended to be limited to the aspects shown here, but in accordance with the widest scope consistent with the principles and novel features disclosed herein.

The above description has been given for the purpose of illustration and description. Furthermore, this description is not intended to limit the embodiments of the present disclosure to the form disclosed herein. Although a number of example aspects and embodiments have been discussed above, those skilled in the art will recognize certain variations, modifications, changes, additions, and sub-combinations thereof.

What is claimed is:

1. A three-dimensional distance measurement method, comprising:
   emitting a first light pulse to illuminate a scene, and acquiring a first image of the scene within a first exposure time;
   emitting a second light pulse to illuminate the scene, and acquiring a second image of the scene within a second exposure time;
   acquiring scene distance information of the scene based on the first image of the scene and the second image of the scene,
   wherein a ratio of the first pulse envelope of a first light pulse to a second pulse envelope of the second light pulse is a monotonic function of time.

2. The three-dimensional distance measuring method according to claim 1, further comprising:

controlling the first exposure time so that during the first exposure time all light pulses returned from objects in the scene are non-zero at any moment of the first exposure time; and controlling the second exposure time so that during the second exposure time all the light pulses returned from the objects in the scene are non-zero at any moment between a second exposure start time and a specific moment before an end of the second exposure, and all are zero after the specific moment.

3. The three-dimensional distance measuring method according to claim 1, further comprising:

either before an emission of the first light pulse, or after an emission of the second light pulse, or between the emission of the first light pulse and the emission of the second light pulse, acquiring a background image of the scene within a background exposure time, wherein the acquiring scene distance information of the scene based on the first image of the scene and the second image of the scene including:

the acquiring scene distance information of the scene based on the background image of the scene, the first image of the scene and the second image of the scene.

4. The three-dimensional distance measuring method according to claim 1, wherein the acquiring scene distance information of the scene based on the first image of the scene and the second image of the scene including:

based on a background image of previous frame or multiple frames, determining the background image for a current frame, the acquiring scene distance information of the scene based on the background image of the scene, the first image of the scene and the second image of the scene.

5. The three-dimensional distance measuring method according to claim 4, further comprising:

controlling emission sequence of the first light pulse and the second pulse light, and controlling the first exposure time to meet a first predetermined duration so that at least a portion of reflected and/or scattered signals of the first light pulse from the objects in the scene are used to acquire the first image of the scene, and controlling the second exposure time to meet a second predetermined duration so that at least a portion of reflected and/or scattered signals of the second light pulse from the objects in the scene are used to acquire the second image of the scene.

6. The three-dimensional distance measuring method according to claim 3, further comprising:

emitting a plurality of third light pulses to illuminate the scene, and acquiring a plurality of third images of the scene within a plurality of corresponding third exposure times;

wherein the acquiring scene distance information of the scene based on the first image of the scene and the second image of the scene includes:

the acquiring scene distance information of the scene based on the first image of the scene, the second image of the scene and the plurality of third images of the scene, and wherein the first light pulse has a first wavelength, the second light pulse has a second wavelength, the plurality of third light pulses has a plurality of third wavelengths, and the first wavelength, the second wavelength and the plurality of third wavelengths are different from each other.

7. A three-dimensional distance measurement method, comprising:

emitting a first light pulse to illuminate a scene, and acquiring the first image of the scene within a first exposure time, and recording a first light emission start time and a first light emission end time of the first light pulse, and a first exposure start time and a first exposure end time of the first exposure time;

emitting a second light pulse to illuminate the scene, and acquiring a second image of the scene within a second exposure time, and recording a second light emission start time and a second light emission end time of the second light pulse, and a second exposure start time and a second exposure end time of the second exposure time;

acquiring scene distance information of the scene based on the first image of the scene and the second image of the scene, the first light emission start time, the first light emission end time, the first exposure start time and the first exposure end time, and the second light emission start time, the second light emission end time, the second exposure start time and the second exposure end time, wherein the first exposure time and the second exposure time are on a same order of magnitude as light pulse duration of the first light pulse and the second light pulse.

8. The three-dimensional distance measuring method according to claim 7, further comprising:

controlling the first exposure time so that during the first exposure time all light pulses returned from objects in the scene are non-zero at any moment of the first exposure time; and controlling the second exposure time so that during the second exposure time all the light pulses returned from the objects in the scene are non-zero at any moment between the second exposure start time and a specific moment before the end of the second exposure, and all are zero after the specific moment.

9. The three-dimensional distance measuring method according to claim 7, further comprising:

either before an emission of the first light pulse, or after an emission of the second light pulse, or between the emission of the first light pulse and the emission of the second light pulse, acquiring a background image of the scene within a background exposure time, wherein the acquiring scene distance information of the scene based on the first image of the scene and the second image of the scene including:

the acquiring scene distance information of the scene based on the background image of the scene, the first image of the scene and the second image of the scene.

10. The three-dimensional distance measuring method according to claim 7, wherein the acquiring scene distance information of the scene based on the first image of the scene and the second image of the scene including:

based on a background image of previous frame or multiple frames, determining the background image for a current frame, the acquiring scene distance information of the scene based on the background image of the scene, the first image of the scene and the second image of the scene.

11. The three-dimensional distance measuring method according to claim 10, wherein the acquiring scene distance information of the scene based on the first image of the scene and the second image of the scene including:

based on a background image of previous frame or multiple frames, determining the background image for the current frame, the acquiring scene distance information of the scene based on the background image of the scene, the first image of the scene and the second image of the scene.

\* \* \* \* \*